United States Patent [19]

George

[11] Patent Number: 5,648,703
[45] Date of Patent: Jul. 15, 1997

[54] DEFLECTION CORRECTION SIGNAL TIMING

[75] Inventor: John Barrett George, Carmel, Ind.

[73] Assignee: Thomson Consumer Electronics, Inc., Indianapolis, Ind.

[21] Appl. No.: 426,597

[22] Filed: Apr. 21, 1995

Related U.S. Application Data

[63] Continuation-in-part of Ser. No. 351,906, Dec. 8, 1994, Pat. No. 5,497,055.

[51] Int. Cl.⁶ .................................................. G09G 1/04
[52] U.S. Cl. ............................................ 315/371; 315/398
[58] Field of Search ......................................... 315/370, 371, 315/364, 398; 348/746

[56] References Cited

U.S. PATENT DOCUMENTS

| | | | |
|---|---|---|---|
| 4,064,406 | 12/1977 | Tiemeijer | 307/228 |
| 4,814,671 | 3/1989 | Oguino et al. | 315/370 |
| 4,816,908 | 3/1989 | Colineau et al. | 358/60 |
| 5,166,576 | 11/1992 | Roussel et al. | 313/431 |
| 5,179,319 | 1/1993 | Iwasaki et al. | 313/440 |
| 5,218,275 | 6/1993 | Truskalo | 315/368.21 |
| 5,282,033 | 1/1994 | Gleim et al. | 358/139 |

FOREIGN PATENT DOCUMENTS

| | | |
|---|---|---|
| 0454007A2 | 10/1991 | European Pat. Off. . |
| 0594432A2 | 4/1994 | European Pat. Off. . |

OTHER PUBLICATIONS

Application Ser. No. 08/287,695, filed Aug. 9, 1994, *Projection Television Apparatus*.
EPO Search Report for Application 95 10 3533.

*Primary Examiner*—Gregory C. Issing
*Attorney, Agent, or Firm*—Joseph S. Tripoli; Joseph J. Laks; Francis A. Davenport

[57] ABSTRACT

A deflection waveform correction signal generator comprises a parabolic shaped signal generator and first and second sawtooth shaped waveform generators. The first horizontal frequency sawtooth shaped waveform is generated by a clipped retrace pulse. The first sawtooth generator has an output coupled to an integrating circuit for generating a parabolic shaped signal. The sawtooth generator and sawtooth waveform integrator are reset at a horizontal rate by reset pulses of differing duration. The different duration of reset pulses results in the parabolic signal having regions of non-parabolic shape. A control loop is coupled to the integrator and measures and maintains a pulse duration generated responsive to the parabolic signal. A control current is generated responsive to the pulse duration and is coupled to the integrator input to cause the parabolic shaped signal to be generated at a predetermined time interval. The pulse is also coupled to the second sawtooth generator which generates a horizontal rate signal for skew and trapezium correction. A multiplying circuit generates a trapezoidal correction signal by multiplication of the second sawtooth signal and a vertical rate sawtooth signal.

13 Claims, 4 Drawing Sheets

DEFLECTION CORRECTION SIGNAL TIMING

CROSS REFERENCE TO RELATED APPLICATION

This application is a continuation in part of application Ser. No. 08/351906 filed Dec. 8, 1994 now U.S. Pat. No. 5,497,055.

BACKGROUND OF THE INVENTION

This invention relates to the field of video display, and in particular to the generation and timing of deflection waveform correction signals for cathode ray tube display.

In a projection type video display, the usual geometrical raster distortions associated with a cathode ray tube display may be exacerbated by the use of CRTs with curved, concave spherical phosphor display surfaces and the inherent magnification in the optical projection path. A curved face plate CRT may offer benefits in terms of a reduction of projection path length, and optical imaging simplification. However since the displayed image is composed of the three projected rasters in register on the screen, multiple corrective deflection waveforms are required to compensate for geometrical distortions resulting from the combination of electron beam deflection, tube face plate shape and optical display path. Hence, to satisfy more stringent convergence requirements imposed by large screen viewing the correction waveforms must be specially shaped, stably generated and accurately timed.

SUMMARY OF THE INVENTION

A deflection correction waveform generator comprises: means for generating a parabolically shaped signal responsive to a horizontal retrace pulse; means for controlling the generating means to maintain a predetermined horizontal time relationship between the parabolically shaped signal and the horizontal retrace pulse; and, a sawtooth shaped signal generator coupled to an output signal of the control means and generating responsive thereto a sawtooth shaped signal having a predetermined horizontal phase relative to the horizontal retrace pulse for coupling to provide a corrective deflection current.

DETAILED DESCRIPTION

Figures 1B, 1C, 1D, 1E:
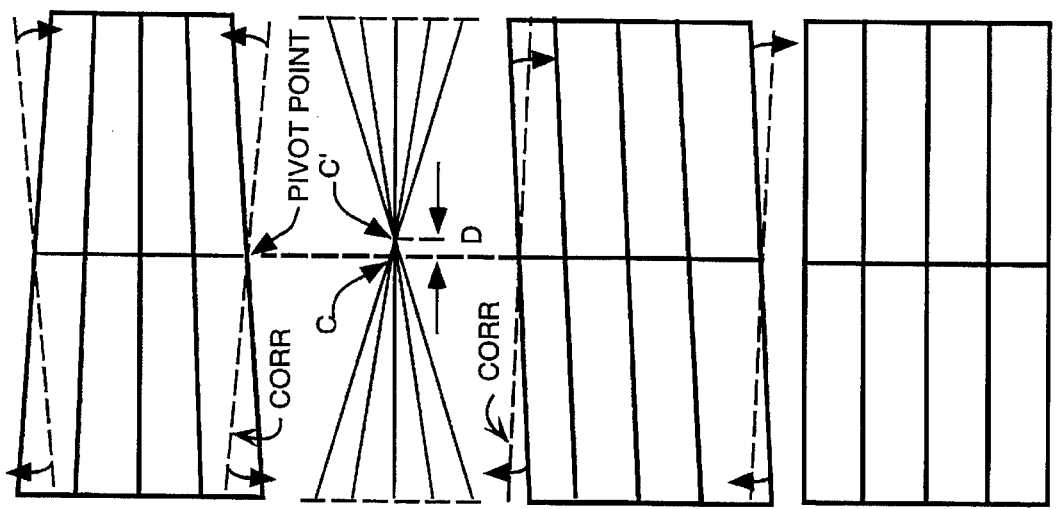
FIGS. 1A–1E are a simplified block diagram of a CRT projection display including inventive features and rasters depicting various geometrical distortions.
Figure 1A:
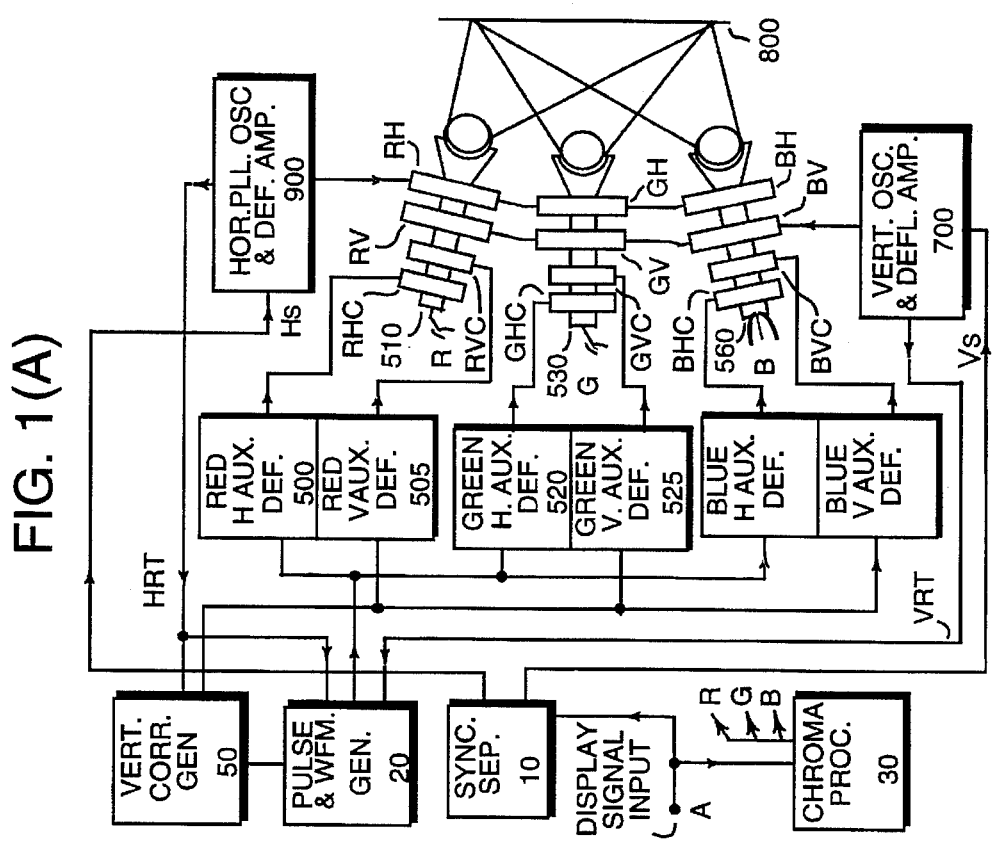

A video display employing cathode ray tube projection is illustrated in FIG. 1(A). Three cathode ray tubes are mechanically arranged, and optically coupled, to project images from CRT phosphor display surfaces to form a single raster on a screen. Each CRT displays an essentially monochromatic color raster appropriate to the color signal coupled thereto. The color signals are derived from a display signal input signal. The center CRT, for example, displaying a green raster, may be positioned such that the raster center is orthogonal to the screen. The two other tubes are symmetrically displaced from the center tube position and consequently only the vertical part of their raster is projected orthoganally onto the screen. Thus, in the highly simplified arrangement of FIG. 1(A), the outer displayed rasters will suffer a trapezoidal geometrical distortion in addition to other geometrical distortions resulting from electron beam scanning. The cathode ray tubes shown in FIG. 1(A) have a curved, concave spherical phosphor display surface. Thus, the projected image, composed of the three rasters in register on the screen, requires corrective deflection waveforms to compensate for geometrical distortions resulting from the combination of electron beam deflection, tube face plate shape and optical display path.

Various forms of geometrical distortion result from electron beam scanning. For example, FIG. 1(B) illustrates geometrical distortion in the vertical scanning direction known as North-South trapezium distortion. With this form of distortion the vertical scanning speed may be considered to be modulated by a horizontal rate sawtooth signal, producing incorrect positioning of the line scan structure, as shown in FIG. 1(B). The dotted line CORR illustrates the corrective effect required to obviate the distortion. The corrective effect must pivot about the display center line in order to produce equal corrective effects at the raster edges.

A similar distortion of the horizontal line scan structure is illustrated FIG. 1(D), which shows skew distortion where scan line placement within the scanned raster is skewed or linearly tilted up or down. The dotted line CORR illustrates the corrective effect required to obviate the skew distortion. The corrective effect must pivot about the display center line in order to produce equal corrective effects at the raster edges.

The desired result of deflection waveform correction is illustrated in FIG. 1(E) which represents the displayed, registered, combination of the three colored rasters. In FIG. 1(E) the vertical position of the horizontal scan lines of each raster have been corrected such that they are nominally parallel, one with the other, and any differential placement errors have been minimized to largely eliminate the formation of spurious colored edges or convergence errors. North South trapezium correction conventionally utilizes a horizontal rate sawtooth or ramp signal which is modulated with a vertical rate ramp signal. An idealized modulated North/South trapezium correction waveform is depicted, at horizontal rate in FIG. 1(C), which shows the corrective waveform shapes at the top, bottom and center of a raster. FIG. 1(C) also illustrates a horizontal mis-timing or phasing D, of the horizontal sawtooth component of the modulated waveform as viewed on the display. Horizontal mis-timing or delay D, results in an undesirable mis-centering of the trapezium corrective effect, where pivot point C, about which correction is progressively applied, is shifted to C". A further consequence of delay D, is an imbalance in trapezoidal corrective amplitude between left and right raster edges. Mis-centering of the corrective effect is exacerbated towards the raster edges by the concave spherical display faced which may be considered to effectively translate distortion shapes. Thus, to compensate for the effects of delay D, the horizontal sawtooth component employed for both skew and trapezium correction is inventively generated with an advanced horizontal phase.

In FIG. 1(A) a video signal is input at terminal A and is coupled to a chroma processor 30, which extracts from the signal, color components, for example, red green and blue for display on cathode ray tubes 510, 530, 560. The three cathode ray tube displays are optically projected to form a single image on screen 800. The video signal at terminal A is also coupled to a synchronizing pulse separator 10, which derives horizontal HS, and vertical rate sync pulses VS, from the signal. The separated horizontal sync pulses HS are coupled to a phase locked loop horizontal oscillator and deflection amplifier 900. Separated vertical sync pulses VS, are coupled to a vertical oscillator and deflection amplifier 700. The horizontal PLL oscillator and deflection amplifier 900 is coupled to three horizontal deflection coils, RH, GH, BH, which are connected in parallel. Coil RH represents the red horizontal deflection coil, and coils GH and GB represent the green and blue horizontal deflection coils respectively. Similarly, the vertical oscillator and deflection amplifier 700 is coupled to three vertical deflection coils connected in series, where RV represents the red vertical coil, GV and BV the green and blue coils respectively.

Deflection waveform correction is provided by corrective currents coupled to individual horizontal and vertical auxiliary deflection coils positioned, for example, on each tube neck. Auxiliary deflection coils RHC and RVC, deflecting in the horizontal and vertical directions respectively, are positioned on the red CRT neck. Similarly, auxiliary deflection coils GHC and GVC, and BHC and BVC, green and blue respectively, are located on the green and blue CRT necks. The auxiliary deflection coils are driven by auxiliary horizontal and vertical deflection amplifiers 500/505, 520/525, and 540/545 which represent the red, green and blue channels respectively. The red horizontal auxiliary deflection amplifier 500, comprises a summer/driver amplifier which develops a composite correction signal that is coupled to the horizontal auxiliary deflection coil RHC. The red vertical auxiliary deflection amplifier 505 also comprises a summer/driver amplifier which produces a composite correction signal that is coupled to the vertical auxiliary deflection coil RVC. The same circuit configuration is utilized for the green and blue channels. The composite correction signal is developed by summation of a selection of signals having particular waveform shapes and individual amplitude control. Horizontal correction signals which are generated by circuitry within a pulse and waveform generator 20, and are coupled to the red, green and blue horizontal correction summing amplifiers, 500, 520 and 540.

Figure 2:
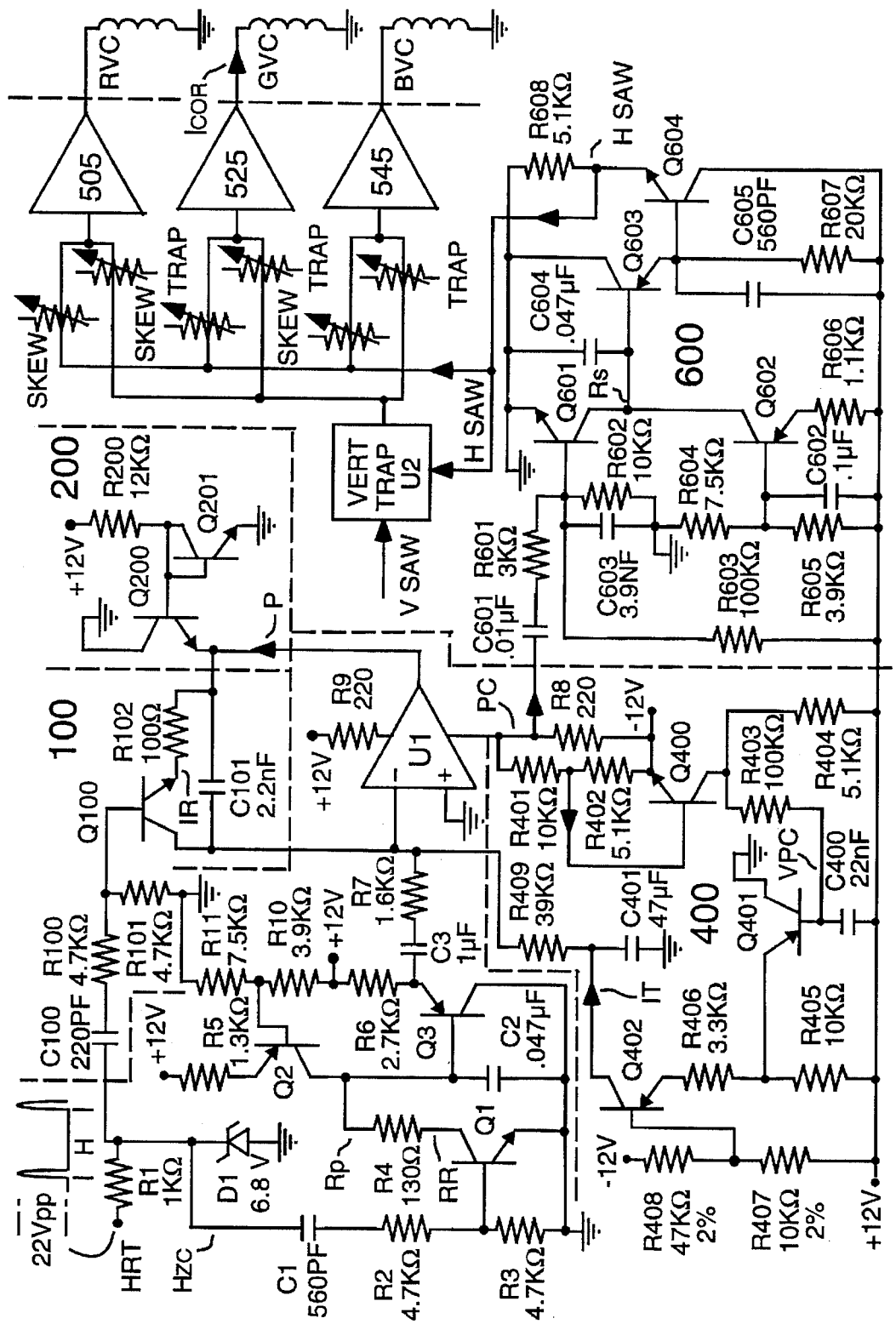
FIG. 2 is a schematic drawing showing inventive features of FIG. 1.

An inventive vertical correction signal generator 50, shown in greater detail in FIG. 2, generates a correction signal which is coupled to the red, green and blue vertical correction summing amplifiers, 505, 525 and 545. The vertical correction signal generator 50 receives a horizontal retrace signal input HRT, from the horizontal oscillator and deflection amplifier 900, and a vertical rate sawtooth signal from the pulse and waveform generator 20. The pulse and waveform generator 20 receives a vertical rate pulse VRT, from the vertical oscillator and amplifier 700 and the horizontal retrace pulse HRT from the horizontal deflection amplifier 900. In addition to generating deflection drive signals, the pulse and waveform generator produces various deflection waveform correction signals with the exception of corrective waveforms for the North/South direction.

The horizontal retrace pulse signal HRT is clipped and used to generate a first horizontal rate ramp signal which is integrated to form a horizontal rate, parabolically shaped signal. The parabolic shaped signal is generated with a horizontal rate tilt component which results in a more negative cusp of the parabolic signal being clipped. The clipping action results in a current limited condition in the output stage of integrator U1, which is measured and controlled to maintain a constant clip duration. The current limited condition results in the generation of a horizontal rate pulse PC, occurring approximately 4 μseconds in advance of a clipped horizontal retrace pulse Hzc. Pulse PC is delayed by approximately 2 μseconds and is used to reset a second ramp or sawtooth generator. Thus, the second horizontal rate sawtooth occurs about 2 μseconds ahead of pulse Hzc and is coupled to provide skew correction input to auxiliary deflection amplifiers 505, 525, 545, and the respective vertical correction coils RVC, GVC and BVC. The early sawtooth is also coupled to a multiplier U2 which is also supplied with a vertical rate sawtooth. The modulated output from multiplier U2 is a series of horizontal ramps of progressively reducing slopes which go to zero at the center of the vertical saw and then reverse polarity and progressively increase with an opposite slope. These modulated sawteeth are coupled to provide a trapezium correction signal input to the auxiliary deflection amplifiers and correction coils.

A horizontal retrace pulse signal HRT is coupled via a resistor R1 to the cathode of zener diode clipper D1 which advantageously generates a clipped pulse Hzc. The horizontal retrace pulse HRT has a nominally 22 volt peak amplitude, however the shape and horizontal phasing of the peak pulse amplitude may be modulated by the video content of the displayed image, as illustrated in waveform B of FIG. 4. Such retrace pulse modulation may result in spurious, unwanted horizontal phase modulation of correction signals relative to the horizontal deflection. The advantageous zener diode clipper is selected to have a breakdown voltage which corresponds to the retrace pulse amplitude value at which the horizontal PLL oscillator is synchronized. Since clipped pulse Hzc, and thus the derived correction waveforms, are derived from the retrace pulse at the same waveform point or amplitude as the horizontal PLL, unwanted phase modulation between deflection and correction signals is essentially eliminated ensuring that both deflection and correction waveforms track together. The horizontal PLL is synchronized at a retrace pulse amplitude of nominally 6.8 volts, hence clipping zener diode D1 is selected to have a 6.8 volt break down voltage. Thus the nominally 22 volt retrace pulse HRT, which contains power supply loading, video dependent amplitude and pulse shape variations are advantageously eliminated by the clipping action of zener diode D1. The zener diode produces a nominal pulse amplitude of 7.4 volts peak to peak, which represents +6.8 volts plus -0.7 volt reverse conduction. The advantageous use of zener diode clipper D1 largely removes video signal and beam current related variations of retrace pulse shape and amplitude. Thus, undesirable horizontal phase modulation of the correction waveform is largely eliminated. A further benefit from zener clipping is the removal of retrace pulse shape, rise time and amplitude variations, which if allowed to occur prior to differentiation, may result in reset pulse timing and width variations. Reset pulses are generated from the same polarity of differentiated pulse edge. Furthermore the reset pulse may have a duration, or width, greater than half the duration of retrace pulse HRT, which is not possible if the reset pulse is differentiated directly from pulse HRT without clipping.

The clipped retrace pulse Hzc, at the cathode of diode D1, is coupled to a series network comprising a capacitor C1 which is connected to a pair of series connected resistors R2 and R3. Resistor R3 is connected to ground and the junction of the resistors is connected to the base of a transistor Q1. The time constant of the series connected network is such that the clipped retrace pulse is differentiated and applied to the base of transistor Q1. The emitter terminal of transistor Q1 is connected to ground and the collector terminal is connected to a capacitor C2 via a resistor R4. The emitter terminal of transistor Q2 is connected to a +12 volt supply via a resistor R5 and the collector is connected to the junction of capacitor C2, resistor R4 and the base of a transistor Q3. Transistor Q3 functions as an emitter follower with the collector terminal connected to ground and the emitter terminal connected to the +12 volt supply via a resistor R6. Transistor Q2 is a constant current source where the current magnitude is controlled by the potential applied between the emitter and base terminals. The collector current of transistor Q2 charges capacitor C2 towards +12 volt, generating a nominally linear first ramp of increasing voltage. The differentiated positive edge of the clipped retrace pulse is applied to the base of transistor Q1 causing it to saturate for approximately 8 microseconds. Thus the ramp voltage, formed across capacitor C2, is discharged via transistor Q1 and resistor R4. The discharge time constant of ramp forming capacitor C2 is largely determined by resistor R4, which is selected to generate an exponentially shaped voltage discharge ramp. The horizontal rate, shaped first ramp signal Rp, is coupled via emitter follower Q3, to series connected capacitor C3 and resistor R7 which are coupled to an inverting input of an integrating amplifier U1. Amplifier U1 is powered from the +12 volt supply via a resistor R9, and from the −12 volt supply via a resistor R8. The non-inverting input of amplifier U1 is grounded.

Circuit 100 is an advantageous horizontal rate integrator and reset pulse generator. The clipped retrace pulse Hzc is also coupled to a series connected network comprising a capacitor C100 which is connected to a series connected pair of resistors R100 and R101. Resistor R101 is connected to ground and the junction of the resistors is connected to the base of a transistor Q100. The time constant of the series connected network differentiates the clipped retrace pulse, with the positive edge causing transistor Q100 to saturate for 5 microseconds generating integrator reset pulse IR. The emitter terminal of transistor Q100 is connected to a resistor R102 which is connected to the output of U1, and the collector terminal is connected to the inverting input of U1. Thus transistor Q100 discharges or resets, via resistor R102, the integrating capacitor C2 of the integrator formed by I.C. U1. Since the discharge time constant of resistor R102 and integrating capacitor C101 is short, approximately 0.5 microseconds, integrator capacitor C101 is rapidly discharged and held reset for the remainder of the conduction period.

The first ramp signal is coupled via capacitor C3 and resistor R7, to the inverting input of amplifier U1. The output terminal of amplifier U1 is coupled, via integrating capacitor C101, back to the inverting input thus causing the first ramp signal be integrated, and generate a generally parabolic shaped output signal P. The output signal P, of integrator U1 is connected to a clipper or active clamp advantageously formed by circuit 200. Parabolic correction signal P is connected to an emitter terminal of a transistor Q200. The collector of transistor Q200 is connected to ground and the base is connected to the base of a transistor Q201. The base and collector terminals of a transistor Q201 are connected together and the emitter is connected to ground. Thus transistor Q201 functions as a forward biased voltage reference diode which accurately determines the Vbe of clipper transistor Q200. The junction of the base and collector terminals of transistor Q201 are coupled to the +12 volt supply via a resistor R200, which limits the collector current to approximately 1 milliamp. The current gain of transistor Q201, for example 100, establishes a base current of about 10 microamps. The connection of transistor Q201 base and collector terminals results in feedback which generates a base/collector to emitter potential of approximately 0.5 volts, set by the base current of 10 microamps. The 0.5 volt developed across transistor Q201 is applied to the base of transistor Q200 and thus establishes a temperature stable clamping potential at the transistor Q200 emitter.

The output terminal of integration amplifier U1, for example IC type TL082, is connected to the emitter of transistor Q200. Amplifier U1 has an internal current limitation of approximately +/−25 milliamps, hence this determines the maximum current which may be conducted by transistor Q200 during clamping. If for example, transistor Q200 has a current gain of 100, then during clamping, a base current of approximately 250 microamps will result, with a Vbe of approximately 0.6 volts. Since the base to emitter voltages of transistors Q200 and Q201 are tied together and track with temperature, a clamping potential of approximately −100 millivolts is established at transistor Q200 emitter. Thus negative signal excursions at the output terminal of integrator U1 are limited by the clamping action of transistor Q200 emitter to approximately −100 millivolts.

An advantageous pulse width control circuit 400, generates a direct current which is coupled to the inverting input of integrating amplifier U1. Integration of this DC by I.C. U1 results in a horizontal rate, tilt or ramp component being added to the horizontal rate parabolic signal P. The inverting input of integrating amplifier U1 is connected via a resistor R409 to an advantageous pulse width control circuit 400. The direct current coupled via resistor R409 is derived from measurement of a pulse width with reference to a divided potential derived from the positive and negative 12 volt power supplies. As described for advantageous circuit 200, negative excursions of the parabolic signal P are clamped to −100 millivolts by circuit 200. The clamping action of circuit 200 sinks current from the output circuitry of integrating amplifier U1, resulting in current limitation due to the current limiter within the I.C. The output circuitry of I.C. U1 remains in the current limited condition for the duration of the clamped negative signal excursion. The current limiting condition within integrating amplifier U1 may be observed by monitoring the current sourced by the −12 volt supply. At the onset of clipping, for example, the current will increase to the limiting value and remain there for the duration of clipping. Since the −12 volt supply is coupled via a resistor R8, the supply current step to the limitation value will result in a voltage step or pulse, due to the voltage drop across supply resistor R8. Thus current limitation in I.C. U1 generates a positive pulse PC, at the junction of resistor R8 and I.C. U1, having a duration equal to the duration of the clamping action of circuit 200. Pulse PC is coupled to series connected resistors R401 and R402. Resistor R402 is connected to the −12 volt supply and the junction of the resistors forms a potential divider which is connected to the base terminal of a transistor Q400. Transistor Q400 functions as a saturating switch, with the emitter terminal connected to the −12 volt supply. The collector terminal of transistor Q400 is connected via a resistor R404 to the +12 volt supply. The collector of transistor Q400 is also connected to a low pass filter formed by series connected resistor R403 and shunt connected capacitor C400. Capacitor C400 is connected to the +12 volt supply with the junction connected to the base terminal of an emitter coupled amplifier transistor Q401. The collector terminal of transistor Q401 is connected to ground and the emitter is connected to the +12 volt supply via a resistor R405. The emitter of Q401 is also coupled to the emitter terminal of a transistor Q402 via a resistor R406. Transistors Q401 and 402 may be considered as a differential amplifier with gain degeneration, or loop damping, resulting from resistor R406 in transistor Q402 emitter. The base of transistor Q402 is connected to the junction of resistors R407 and R408 which form a potential divider coupled between the positive and negative 12 volt supplies. Resistor R408 is connected to the −12 volt supply and resistor R407 is connected to the +12 volt supply. The collector terminal of transistor Q402 is decoupled to ground by a capacitor C401 and is connected to the inverting input of integrating amplifier U1 via a resistor R409.

The positive pulse PC at resistor R8 is amplified and inverted by transistor Q400. The inverted collector pulse is low pass filtered, or integrated, by resistor R403 and capacitor C400 to produce a DC voltage VPC. The low passed DC voltage VPC, has an amplitude which varies in proportion to the width of pulse PC. Voltage VPC is coupled to the differential amplifier formed by transistors Q401 and Q402 where it is compared with a reference DC voltage generated by potential divider resistors R407 and R408. The potential divider is coupled between the supply voltages which power the integrator and allied circuitry, thus variations in either supply will result in a change to the reference potential and a compensating correction in pulse width. The potential divider resistors R407 and R408 can be of tighter tolerance values, for example 2%, in order to improve the accuracy of pulse PC width. The potential divider generates a reference voltage equal to a ratio of 11/63.5 of the voltage existing between the positive and negative 12 volt supplies. The ratio of 11/63.5 represents the width, or duration, of pulse PC as a ratio of the horizontal period. Thus, variations of voltage VPC are compared with the reference voltage, which represents the desired pulse duration, and cause a corrective current to flow in transistor Q402. The corrective current IT is coupled via resistor R409 to vary the bias current at the inverting input of amplifier U1. The integrated effect of the corrective DC bias current IT, introduced by resistor R408, is to cause the output signal of U1 to be superimposed on a shallow ramp having a slope proportional to the current IT. Thus parabolic signal P is tilted, causing the waveform cusps to have different DC potentials, with the result that negative parabolic signal excursions are clamped by circuit 200. The clamping action results in the generation of a current limit pulse PC which has a width or duration which is controlled responsive to the corrective bias current IT. Since integrating amplifier U1 is reset coincident with the rising edge of pulse Hzc, so too is the tilted parabolic signal P. Hence, the failing edge of pulse PC is also coincident with the rising edge of pulse Hzc. The advantageous circuit 400 controls the width of pulse PC by varying the rising edge timing to compensate for variations in power supplies and the clamping voltage of circuit 200.

Pulse PC is generated in advance of the clipped horizontal retrace pulse Hzc by approximately 4 μseconds, and is coupled to reset a second ramp generator 600. Ramp or saw generator 600 generates an early, or horizontally advanced, sawtooth shaped signal for skew and North/South trapezium correction. Pulse PC is AC coupled via a capacitor C601 and a series resistor R601 to a base terminal of a switch transistor Q601. The base of transistor Q601 is also connected to the junction of resistor R602 and resistor R603 which form a potential divider, with resistor R602 connected to ground and resistor R603 connected to the positive 12 volt supply. A capacitor C603 is connected between the base of transistor Q601 and signal ground. The emitter of transistor Q601 is connected to ground and the collector terminal is joined to the junction of a capacitor C604 and a collector terminal of a current source transistor Q602. A sawtooth waveform is developed across capacitor C604. The base of transistor Q602 is connected to the junction of resistor R604 and resistor R605 which form a potential divider, with resistor R604 connected to ground and resistor R605 connected to the positive 12 volt supply. A decoupling capacitor C602 is connected between the base of transistor Q602 and the positive 12 volt supply. The junction of capacitor C604 and the collectors of transistors Q601 and Q602 is also coupled to the base terminal of an emitter follower connected PNP transistor Q603. The collector terminal of transistor Q603 is connected to ground and the emitter is coupled to the junction of the base terminal of an NPN transistor Q604, and a parallel combination of a resistor R604 and a capacitor C605 connected to the positive 12 volt supply. Transistor Q604 is configured as an emitter follower with a collector terminal connected to the positive 12 volt supply and the emitter terminal connected to ground via a resistor R608. The early sawtooth shaped signal at the emitter of transistor Q604 is coupled to provide a skew correcting signal input to the red green and blue auxiliary deflection amplifiers 505, 525 and 545 respectively. The early sawtooth signal also coupled to multiplier U2 where it is modulated by a vertical rate sawtooth signal to produce an output signal for the correction of trapezium distortion. The output from multiplier U2 is coupled to the auxiliary deflection amplifiers 505, 525 and 545 which generate the required corrective currents in the respective auxiliary deflection coils RVC, GVC and BVC.

Figure 3A:
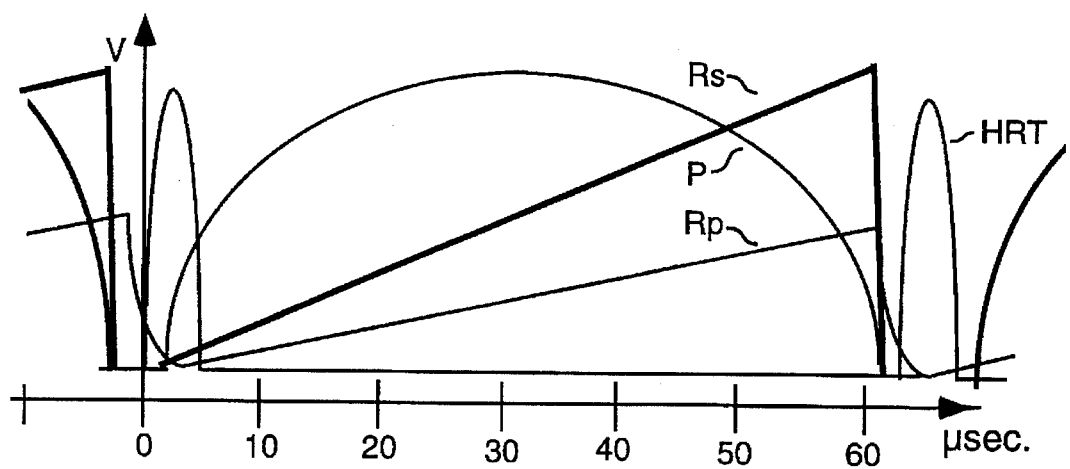
FIGS. 3A–3B depict various inventive waveforms.

FIG. 3 (A) illustrates various waveforms and their timing relationships depicted during a horizontal interval and referenced to the start of the horizontal retrace pulse HRT. The signal amplitudes in (A) are for illustrative purposes only. Retrace pulse HRT may be derived, for example, from a CRT heater winding on a horizontal deflection output transformer, and may have a pulse amplitude of approximately 22 volts. The pulse depicted in (A) has a nominal duration of approximately 12 microseconds and is illustrated without typical shape, width and rise time modulations resulting from various loading mechanisms. Waveform Rp represents the horizontal rate ramp Rp occurring at the collector of transistor Q2 of FIG. 2. Ramp Rp is depicted with a linear ramp up. However, the exponential reset period resulting from the action of discharge resistor R4 is shown. The shaped parabolic signal is depicted by waveform P, generated at the output of I.C. U1 in FIG. 2. The specific parabolic signal start and stop times are more accurately depicted in waveform (B) of FIG. 3. However, the advanced horizontal phase of parabolic signal P relative to horizontal retrace pulse HRT, illustrates the advantageous phase advance required to compensate for the delaying effects present in the deflection correction signal path. Thus, deflection correction waveforms may be advantageously generated which provide corrective effects which are horizontally centered and pivot about the center line of the displayed image.

Waveform (B) of FIG. 3, illustrates the horizontal phasing of various waveforms utilized to generate the advantageous corrective waveform timing. Correction waveform P, although nominally parabolically shaped, comprises various additional waveshapes which provide specific correction at specific raster locations. Waveform (B) shows the phasing of the horizontal retrace pulse HRT at time t0, relative to various waveforms occurring during the display of left and right raster sides. At time RHS, t3–t0, the right hand side of the raster is displayed, and correction waveform P is shaped by the clamping action circuit 200. Advantageous clamp 200 clips the negative cusps or peaks, which results in zero corrective waveform amplitude during time t3–t0, for example, 4 microseconds. The current limit pulse PC is depicted occurring at time RHS, t3–t0. The falling edge of pulse PC is coincident with the start of the integrator reset pulse IR, since pulse IR ends the integration period and thus ends parabola generation. Any instability in the horizontal timing of waveform P will be indicated by movement of the leading edge of pulse PC, which changes the pulse width. Although waveform P is reduced to zero at time RHS, when the right side of the raster is displayed, the actual modulated current ICOR, in the respective correction coils is not only delayed but also suffers a degradation in rise/fall times. Thus the apparent abrupt waveform discontinuity of signal P at time t3 is smoothed or flared towards a zero correction value. The horizontal phasing, or starting point t1, of correction waveform generation is determined by the integrator reset pulse IR. When pulse IR ends at time t1, capacitor C101 is allowed to integrate and initiate generation of correction waveform signal P. At time LHS, t1–t2, the left hand side of the raster is displayed, and corrective waveform P is shaped by integration of the exponential shape EXP, occurring during times t1–t2. The exponential shape is generated by the discharge of capacitor C2 via resistor R4. During time LHS, correction waveform P has a shape resulting from integration of the exponentially shaped discharge portion of ramp signal Rp. At time t2, ramp reset pulse RR ends, exponential discharge ceases, and linear ramp generation is initiated. Thus for trace time, between t2–t3, ramp Rp is integrated producing the parabolic shaped component of correction waveform P.

Figure 3B:
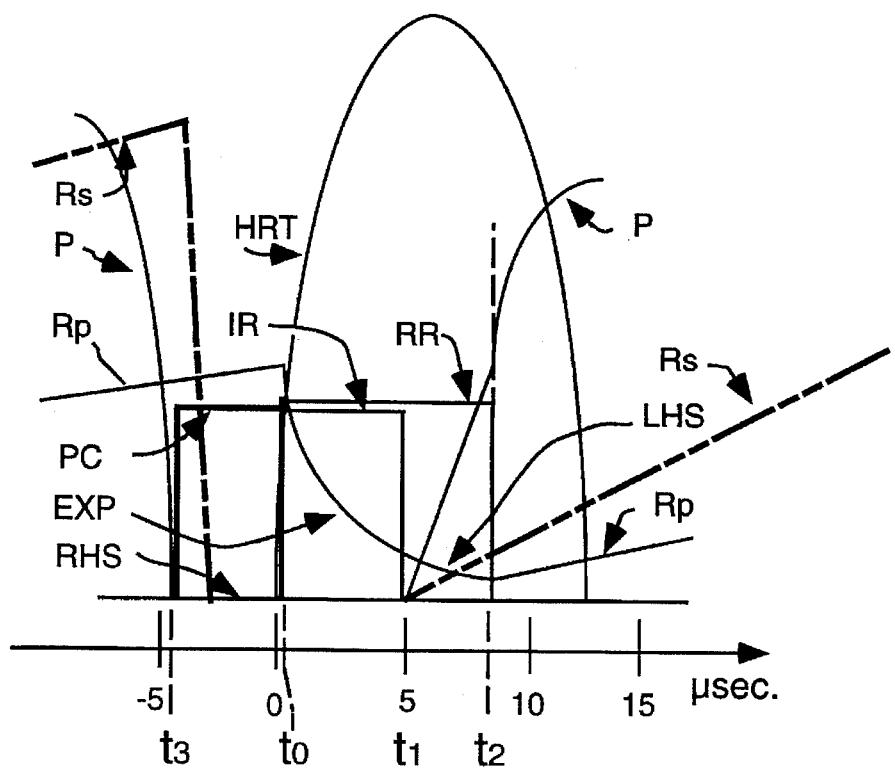
Figure 4A:
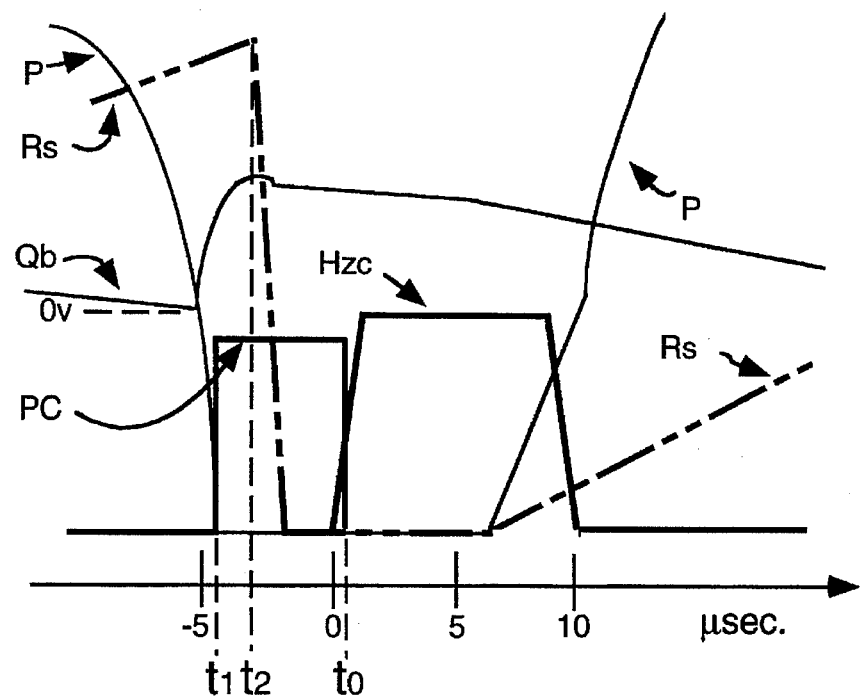
FIGS. 4A–4B depict the inventive waveforms of FIG. 3 occurring about the horizontal blanking interval.
Figure 4B:
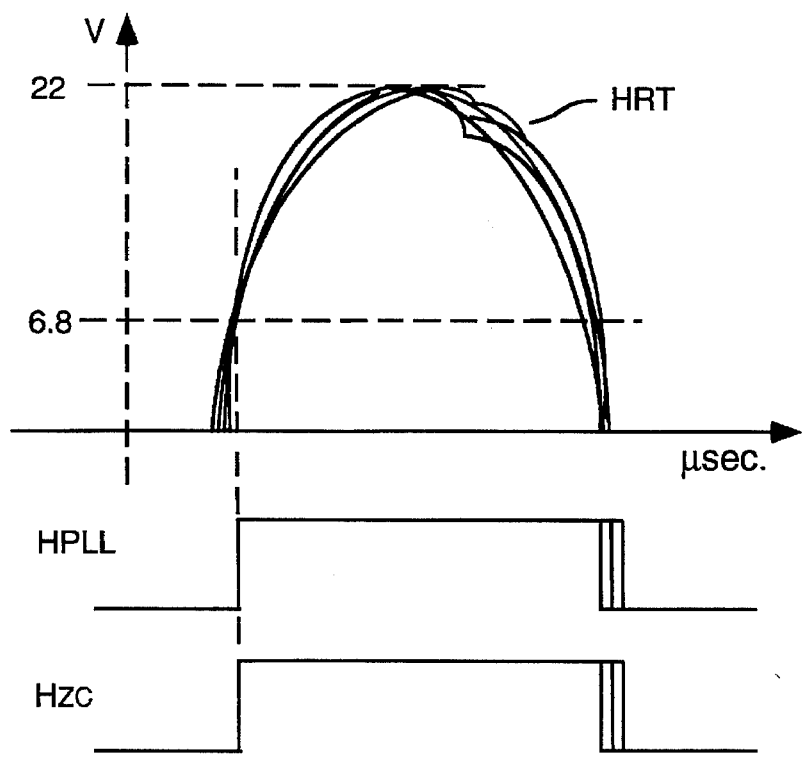

In FIG. 4, waveform (A) illustrates the horizontal phasing of various waveforms, shown in FIG. 3(B), which are utilized to generate the advantageous early signal Rs which is output to provide skew and trapezium correction as correction signal HSAW. In waveform (A), horizontal timing is depicted with referenced at t0 to the rising edge of clipped retrace pulse Hzc, which occurs within the retrace pulse and has a width equal to the time duration Hzc occurring between 6.8 volt amplitude values of the retrace pulse. The rising edge of pulse PC is shown at t1, leading or horizontally advanced by approximately 4 μseconds with respect to pulse Hzc. As has been explained, pulse PC terminates coincidentally with the rising edge of clipped retrace pulse Hzc. Pulse PC is AC coupled to the base of the ramp reset transistor Q601, but is delayed by the action of resistor R601 and shunt capacitor C603. The RC integrating effect of resistor R601 and capacitor C603 introduces a delay of approximately 2.5 μseconds to the rising edge of pulse PC, and this is depicted in waveform Qb, occurring at the base of transistor Q601. Thus delayed pulse PC saturates transistor Q601 which discharges ramp forming capacitor C604 at time t2. At the cessation of delayed pulse PC, transistor Q601 turns off allowing capacitor C604 to be charged by the collector current of transistor Q602.

During display power up, the advantageous pulse width control circuitry shown in FIG. 2 requires time to stabilize prior to the generation of a stable and horizontally advanced pulse PC. To avoid the possibility of the vertical deflection correction amplifiers assuming high dissipation states which may result in power supply cycling, the early ramp generator 600 is disabled until pulse PC is coupled to transistor Q601. Early ramp generation is inhibited by maintaining transistor Q601 in a saturated state, via a pull-up resistor R603, which couples the base of transistor Q601 to the positive supply. When pulse PC occurs, the average value due to the AC coupling is sufficient to ensure that the positive pull-up current is overcome, and transistor Q601 is only turned on during the positive interval of pulse PC. Thus during power up, early ramp generation is inhibited and undesirable power supply cycling is avoided.

The early horizontal rate sawtooth signal Hsaw, is generated and horizontally timed by the parabolic signal control loop which also provides North/South pincushion correction. The early horizontal rate sawtooth signal generator provides corrective signal components which, when delayed by the deflection amplifier and auxiliary coil, produce a corrective effect which centered on the display. Thus North/South skew and trapezium corrections are symmetrically positioned and pivot about the center of the display. Greater convergence accuracy is thus achieved and stably maintained, producing a higher quality image display.

What is claimed is:

1. A deflection correction waveform generator, comprising:

means for generating a parabolically shaped signal responsive to a horizontal retrace pulse;

means for controlling said generating means to maintain a predetermined horizontal time relationship between said parabolically shaped signal and said horizontal retrace pulse; and, a sawtooth shaped signal generator coupled to an output signal of said control means and generating responsive thereto a sawtooth shaped signal having a predetermined horizontal phase relative to said horizontal retrace pulse said sawtooth shaped signal being coupled to provide a corrective deflection current.

2. The deflection correction waveform generator of claim 1, wherein said control means controls said parabolically shaped signal duration responsive to a width of a horizontal rate pulse signal which terminates coincident with a rising edge of said horizontal retrace pulse.

3. The deflection correction waveform generator of claim 1, wherein said sawtooth shaped signal has an advanced horizontal phasing with respect to said horizontal retrace pulse.

4. The deflection correction waveform generator of claim 1, wherein said control means controls said sawtooth shaped signal to maintain an advanced horizontal phase relative to said horizontal retrace pulse.

5. The deflection correction waveform generator of claim 1, wherein said sawtooth shaped signal is coupled to a deflection amplifier and coil for correction of convergence errors.

6. The deflection correction waveform generator of claim 5, wherein said sawtooth shaped signal is coupled to a deflection amplifier and coil for correction of a skew distortion of a raster display.

7. The deflection correction waveform generator of claim 1, wherein said sawtooth shaped signal is coupled to a multiplier for multiplication by a vertical frequency sawtooth shaped signal, and an output signal from said multiplier is coupled to provide trapezium distortion correction.

8. The deflection correction waveform generator of claim 4, said corrective deflection current is generated having a propagation delay, said advanced horizontal phase provides compensation for said delay.

9. The deflection correction waveform generator of claim 1, wherein an advanced horizontal phasing centers a corrective effect of said corrective deflection current on a display raster.

10. The deflection correction waveform generator of claim 7, wherein said parabolically shaped signal, said sawtooth shaped and said multiplier output signal have an advanced horizontal phasing to horizontally center a corrective effect of said corrective deflection current on a display raster.

11. A video display system, comprising:

a cathode ray tube displaying a raster having North/South geometrical distortion, a deflection correction coil mounted on said cathode ray tube for correction of said raster distortion;

a deflection amplifier coupled to said coil and generating therein a raster corrective current; and, means for generating raster correction signals, coupled to said deflection amplifier and responsive to a retrace pulse, said raster correction signals having a horizontal timing controllably advanced relative to said retrace pulse such that a corrective effect of said raster correction signals is horizontally centered on said cathode ray tube.

12. The video display system of claim 11, wherein said raster correction signals comprise a horizontal frequency sawtooth shaped signal and said horizontal frequency sawtooth shaped signal amplitude modulated by a vertical frequency sawtooth shaped signal.

13. The video display system of claim 11, wherein said corrective effect pivots about a horizontal center of said cathode ray tube raster and produces substantially equal corrective effects at opposite raster edges.

* * * * *